Aug. 14, 1951   J. D. MALMQVIST ET AL   2,564,018
INDUCTIVE ANGLE INDICATOR
Filed Aug. 20, 1945
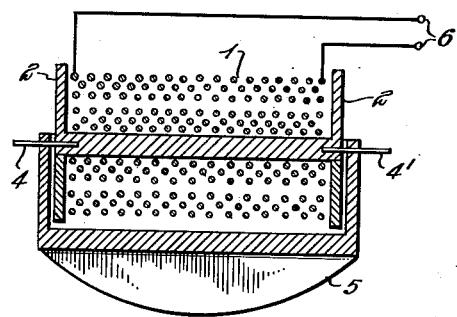
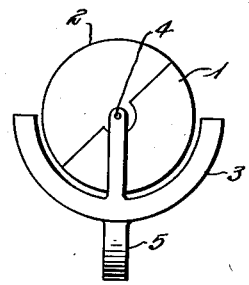
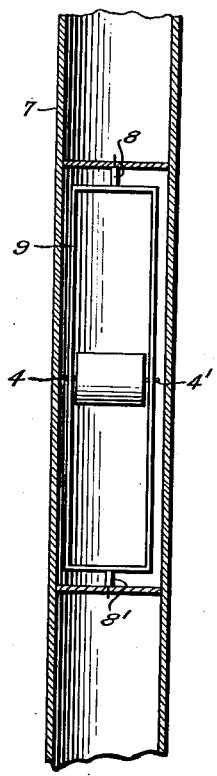
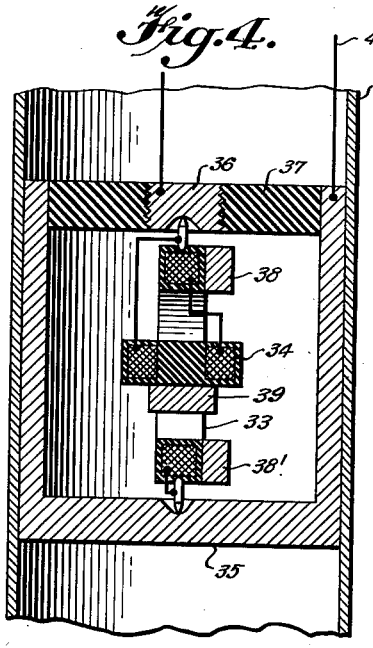
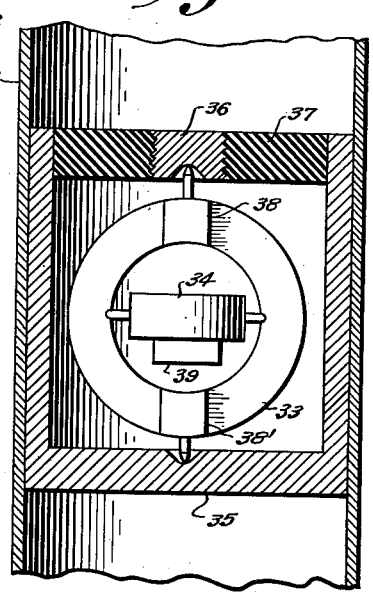
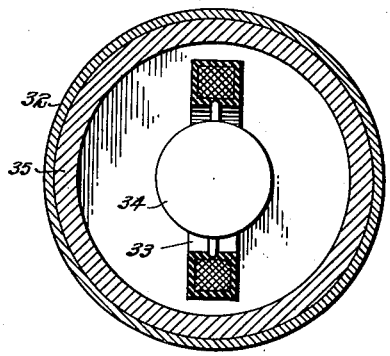
INVENTOR
Johan David Malmqvist
Ivar Goran Ragnar Thomaeus
BY Stevens and Davis
ATTORNEYS

UNITED STATES PATENT OFFICE 2,564,018

INDUCTIVE ANGLE INDICATOR

Johan David Malmqvist, Boliden, and Ivar Göran Ragnar Thomaeus, Kristineberg, Sweden, assignors to Bolidens Gruvaktiebolag, Stockholm, Sweden, a joint-stock company of Sweden Application August 20, 1945, Serial No. 611,613
In Sweden February 29, 1944

Section 1, Public Law 690, August 8, 1946
Patent expires February 29, 1964

2 Claims. (Cl. 33—205)

For determining the direction of bore holes, for instance those that penetrate the rock or loose layers of earth, a great number of methods have been used. In such methods the inclination viz. the angle between the longitudinal axis of the bore hole and the horizontal plane is determined. One may also determine both the inclination and the angle between the longitudinal axis of the bore hole and a certain vertical plane, for instance the magnetic meridian plane. Sometimes the two last mentioned determinations may be effected by means of the same instrument including an earth inductor, but instruments for this purpose often require a very large space. Therefore they have been serviceable only in such great dimensioned bore holes as used in boring for oil. In bore holes of smaller diameter mostly used for boring through ores and non-metallic rocks of commercial importance, methods requiring considerably less spacious apparatus must be used. In such cases the inclination of the bore hole is usually determined in such a manner that a cylindrical bore tube being partly filled with a solution of copper sulphate as electrolyte, is lowered into the bore hole to the depth, at which the inclination is to be measured. A gilt cylinder, the axis of which coincides with the axis of the bore tube, is partly immersed into the electrolytic bath. When measuring the inclination an electric current is sent through the electrolytic bath, whereby a layer of copper is precipitated on the surface of the cylinder. Then the inclination of the bore hole may be calculated by measuring the ellipse formed as the border line between copper and gold on the metal cylinder. This ellipse forms the intersectional line between the horizontal plane (the surface of the liquid) and the metal cylinder. The method may be modified in several different ways, for instance so that wax or paraffin is melted in a cylindrical vessel within a bore tube, whereupon the elliptic intersectional line between the frozen surface of the liquid and the cylinder is measured.

By these methods, which are intended for use in bore holes of small diameter, the determination of the inclination angle will be rather unreliable and time consuming, as the bore tube at each determination must be taken up from the bore hole for measuring the inclination, which is a drawback.

In apparatus of recent types for determining the inclination as used one had made use of an electromagnetic transmitting device, whereby radio frequency has been used. In this way it has been possible to achieve, that frequency in the transmitting device will be dependent on the inclination of the bore hole. However, these apparatus will also require a great deal of space, as the whole transmitting device must be lowered into the bore hole.

The present invention has for its object a method for remote reading in angle determinations, by means of which method it is possible to measure the inclination directly, while the angle indicator is positioned in the bore hole, and without one being obliged to take up the bore tube for each separate determination. The necessary indicator devices may be so small that they may be used also in a bore hole of a very small diameter. The invention is principally characterized in that special angle indicators—including one or more coils, the inductance or mutual inductance of which is dependent on the rotation angle between two or more parts movable in relation to each other—are mounted in one or more tubes linked with each other. In carrying out the measurement the bore tubes are lowered into the bore hole and the self-induction or mutual induction of the indicator coils are measured by means of a special apparatus positioned in the open and connected with said indicators. Hereby a value of the inclination of a bore tube or of the angle between two or more bore tubes linked with each other is obtained.

Several advantages are gained in using variable inductances for the angle indicators. The recording is quite electrical, which involves a more simple construction than in optical recording, for instance by means of a camera. As the movable part of the indicator device does not directly touch the fixed part, all kinds of friction is avoided except that arising in the bearings, and this friction may be made very small.

As will appear from the subsequent description the indicators are constructed in a very simple way. There is no necessity for using a special transmitting device that must be lowered into the bore hole. The only parts of the apparatus that have to be lowered are the indicator and the leading-in wires, while the measuring apparatus proper is positioned in the open.

In the drawings,

Figure 1 is a diagrammatic, longitudinal, sectional illustration of an indicator constructed in accordance with the principles of this invention.

Figure 2 is a diagrammatic, transverse, sectional illustration of the indicator of Figure 1.

Figure 3 is a diagrammatic illustration of the manner in which a device constructed in accordance with Figures 1 and 2 may be lowered into a borehole.

Figure 4 is a diagrammatic, sectional illustration of a modified form of angle indicator constructed in accordance with this invention.

Figure 5 is a diagrammatic, sectional illustration of the device of Figure 4, the view being taken at right angles to the view shown in Figure 4.

Figure 6 is a diagrammatic, sectional illustration of the device of Figure 4, the section being taken in a horizontal plane.

Indicators according to the present invention may be constructed in several different ways. Figures 1 and 2 illustrate an indicator in longitudinal section and in transverse section respectively. A wire wound coil 1 with an iron core is provided with circular side plates, the one half 2 of which consists of ferro-magnetic material. A half-cylindrical shell 3 of iron is freely movable around the shaft 4—4' and at the bottom centre provided with a weight 5, suitably in the form of a keel. If the cylinder shaft 4—4' is positioned in the horizontal plane, upon alterations of the inclination a greater or smaller part of the iron in the side plates will be surrounded by the half-cylinder 3. Thereby the resistance in the coil circuit is altered and the self-induction in the coil will obtain another value. By means of a cable at the tapping point 6, the coil 1 may be connected to an apparatus in the open, where the self-induction is measured, for instance by means of a self-induction bridge. The inclination is obtained from the value of the self-induction. By mounting the device in a bore tube in the manner shown in Figure 3, the shaft 4—4' of the coil will automatically assume a position in the horizontal plane by means of a gimbal mounting of the shafts 4—4' and 8—8'. In the bore tube 7 a cradle 9 is freely movable around the shaft 8—8', which coincides with the axis of the bore tube. In case the centre of gravity of the cradle 9 lies in a plane which contains the shaft 8—8' and is positioned perpendicularly to the shaft 4—4', the cradle will always set in such a manner that the shaft 4—4' lies in the horizontal plane, and in this way one will always obtain the same self-induction in the coil 1 for a certain inclination of a bore hole to the horizontal plane.

In Figures 4, 5 and 6 there is shown an angle indicator device based on the mutual self-induction between two coils. Figure 4 shows a longitudinal section of the device and Figures 5 and 6 show the same device, laterally and from above. The indicator device itself which is mounted in the bore tube 32, consists of two coils 33 and 34, rotatable in relation to each other. The coil 33 is suspended in two taps and is rotatable around a shaft parallel to the shaft of the bore tube. One of the taps rests in a groove of the metal casing 35, whereas the other tap rests in the groove of the metal bolt 36, which is insulated from the other part of the metal casing by means of an insulating material 37. The smaller coil 34 is by means of two taps suspended in the larger coil and is rotatable around a shaft perpendicular to the rotating shaft first mentioned. By means of the weights 38 and 38' the larger coil will always be positioned so that the rotating shaft of the smaller coil is maintained in the horizontal plane and by means of the weight 39 the smaller coil will be maintained in the horizontal plane, and the angle between the two rotatable coils will be the same as the angle between the shaft of the bore tube and the horizontal plane. In case the two coils are coupled in series for instance in such a way as shown in Figure 4, the self-induction in the system coupled in series will be dependent on the angle between the coils. In case the self-induction is measured at the tapping point 40, a value of the inclination of the bore tube is obtained. If the coils are arranged parallel to each other, viz. when the bore tube is horizontal, the self-induction will be at maximum in case the two coils are wound in the same direction. On the contrary, when the coils form an angle with each other of 90° the self-induction will be considerably less or equal to the total of the self-inductions of the two coils.

Angle indication according to the principle of mutual induction, viz. when using two movable coils, is, of course, also possible to use in determining the angle between two or more bore tubes.

In the above mentioned way it is also possible to measure mutual induction between two coils, one of which being freely movable, so that its position is adjusted by the magnetic meridian field (compass) or by a gyro field (gyro compass), the other one being firmly attached to the bore tube.

If a certain damping of the movement of the movable parts of the angle indicator is necessary, a suitable damping liquid may be used in all the constructions.

Angle indication according to the present invention may, of course, be used for other purposes than for measuring directions of bore holes. Generally, it may be used for the determinations of angles at a great distance from the measuring place. For instance directions under water or in subways and other hollows in the ground difficult of access may be determined in the above described manner.

Having thus described our invention we declare that what we claim is:

1. An indicator for making inclination or angular determinations within bore holes of very small diameters comprising an outer flat coil rotatable about a shaft lying in the same plane as said coil and included in the rotatable system of the outer coil, said shaft being mounted in means adapted to be lowered into the bore hole and the direction of the shaft being the same as the direction of the bore hole, and an inner flat coil rotatable within said outer coil and about a shaft the axis of which lies in the same plane as said coil and is perpendicular to the axis of the rotatable system of the outer coil and attached to said system, the rotational axes of said two coils lying in the same plane whereby changes in the position of said indicator cause relative movements between the two coils with consequent measurable alterations in their mutual inductance.

2. An indicator for making inclination or angular determinations as claimed in claim 1, characterized in that the centre of gravity of the outer coil is located offset of the rotatable axis of said outer coil, the arrangement being such that the rotatable axis of said outer coil always is self-aligned in a vertical plane containing the axis of the bore hole, and that the centre of gravity of the rotatable system including the said inner coil always is located offset of the axis of said system.

JOHAN DAVID MALMQVIST.
IVAR GÖRAN RAGNAR THOMAEUS.

REFERENCES CITED

The following references are of record in the file of this patent:

UNITED STATES PATENTS

| Number | Name | Date |
|---|---|---|
| 1,336,399 | Schoute et al. | Apr. 6, 1920 |
| 1,868,833 | Hester | July 26, 1932 |
| 1,884,011 | Lord | Oct. 25, 1932 |
| 1,980,100 | Schlumberger | Nov. 6, 1934 |
| 1,999,215 | Smith | Apr. 30, 1935 |
| 2,012,138 | Palmer et al. | Aug. 20, 1935 |
| 2,317,632 | Miller | Apr. 27, 1943 |

FOREIGN PATENTS

| Number | Country | Date |
|---|---|---|
| 515,733 | Great Britain | Dec. 13, 1939 |